US007387236B2

(12) United States Patent
Jantsch

(10) Patent No.: US 7,387,236 B2
(45) Date of Patent: Jun. 17, 2008

(54) DISPENSING OF CURRENCY

(75) Inventor: Gregory Jantsch, Gulfport, MS (US)

(73) Assignee: Delaware Capital Formation, Inc., Wilmington, DE (US)

( * ) Notice: Subject to any disclaimer, the term of this patent is extended or adjusted under 35 U.S.C. 154(b) by 504 days.

(21) Appl. No.: 09/973,186

(22) Filed: Oct. 9, 2001

(65) Prior Publication Data

US 2004/0099725 A1 May 27, 2004

(51) Int. Cl.
*G06Q 40/00* (2006.01)

(52) U.S. Cl. .......... 235/379

(58) Field of Classification Search .......... 235/379; 271/262, 263, 142, 265.04
See application file for complete search history.

(56) References Cited

U.S. PATENT DOCUMENTS

| | | | | |
|---|---|---|---|---|
| 3,239,213 | A | 3/1966 | Griswold | |
| 3,668,398 | A | 6/1972 | Doering | 250/83.3 D |
| 3,795,395 | A | 3/1974 | Ransom et al. | |
| 4,009,379 | A | 2/1977 | Musch | 235/156 |
| 4,055,341 | A | 10/1977 | Martinez | 273/86 |
| 4,095,159 | A | 6/1978 | Tirelli | 318/605 |
| 4,154,437 | A * | 5/1979 | Butcheck et al. | 271/6 |
| 4,156,620 | A | 5/1979 | Clemens | |
| 4,159,782 | A * | 7/1979 | Swartzendruber | 221/1 |
| 4,378,109 | A | 3/1983 | Takahashi | |
| 4,398,711 | A | 8/1983 | Horst et al. | 271/263 |
| 4,420,747 | A | 12/1983 | Kistner | 340/674 |
| 4,462,587 | A | 7/1984 | Graef et al. | 271/263 |
| 4,494,747 | A * | 1/1985 | Graef et al. | 271/263 |
| 4,524,268 | A | 6/1985 | Fukatsu | |
| 4,550,252 | A | 10/1985 | Tee | 250/223 R |
| 4,559,452 | A | 12/1985 | Igaki et al. | 250/560 |
| 4,577,779 | A | 3/1986 | Atalla | 221/1 |
| 4,664,369 | A | 5/1987 | Graef et al. | 271/263 |
| 4,672,750 | A | 6/1987 | Storace et al. | 33/199 R |
| 4,693,010 | A | 9/1987 | Sills | |
| 4,700,368 | A | 10/1987 | Munn et al. | 377/8 |
| 4,711,532 | A | 12/1987 | Choe | |
| 4,715,007 | A | 12/1987 | Fujita et al. | 364/563 |

(Continued)

FOREIGN PATENT DOCUMENTS

| | | |
|---|---|---|
| DE | 29 16 096 | 10/1979 |

(Continued)

OTHER PUBLICATIONS

Hadley, L. et al., "A Microprocessor-Based Servo-Loop for Linear Position Control", *Electro, Conference Record*, pp. 1-8 May 1982.

(Continued)

*Primary Examiner*—Ahshik Kim
(74) *Attorney, Agent, or Firm*—Fish & Richardson P.C.

(57) ABSTRACT

Among other features, a cash dispenser includes a paper path arranged between an opening in a money box through which currency can be withdrawn for dispensing to a customer at a dispensing location that is spaced apart from the opening in the money box, the paper path including rotational shafts arranged to transfer the currency, and a housing that supports the paper path and is configured to receive the money box, the housing comprising at least two parallel spaced-apart molded side walls, the paper path having a third molded wall between the two parallel molded side walls.

16 Claims, 13 Drawing Sheets

U.S. PATENT DOCUMENTS

| | | | | |
|---|---|---|---|---|
| 4,729,556 | A * | 3/1988 | Fujii et al. | 271/263 |
| 4,731,523 | A | 3/1988 | Kozima | |
| 4,753,433 | A | 6/1988 | Rodi et al. | 271/263 |
| 4,776,071 | A | 10/1988 | Yoshizawa | |
| 4,836,528 | A | 6/1989 | Geiser | 271/263 |
| 4,879,513 | A | 11/1989 | Spiegel et al. | 324/207 |
| 5,011,128 | A | 4/1991 | Tsuji | 271/263 |
| 5,075,622 | A | 12/1991 | Konii et al. | 324/229 |
| 5,094,678 | A | 3/1992 | Kramer et al. | |
| 5,100,022 | A | 3/1992 | Fukudome et al. | |
| 5,174,562 | A | 12/1992 | Mizunaga et al. | |
| 5,183,999 | A | 2/1993 | Hakenewerth et al. | 235/379 |
| 5,203,555 | A * | 4/1993 | Cannaverde et al. | 271/263 |
| 5,207,788 | A | 5/1993 | Geib et al. | 271/122 |
| 5,577,720 | A | 11/1996 | Laskowski | 271/265.04 |
| 5,701,178 | A | 12/1997 | Burns et al. | 356/371 |
| 5,704,607 | A | 1/1998 | Brotherston | 271/96 |
| 5,712,804 | A | 1/1998 | Elbling | 364/563 |
| 5,813,510 | A | 9/1998 | Rademacher | |
| 5,967,364 | A | 10/1999 | Swanson et al. | 221/6 |
| 5,971,392 | A * | 10/1999 | Lee | 271/265.02 |
| 6,000,693 | A | 12/1999 | Tranquilla | |
| 6,006,989 | A | 12/1999 | Ademmer et al. | |
| 6,082,731 | A | 7/2000 | Yamazaki | |
| 6,109,522 | A | 8/2000 | Force et al. | |
| 6,189,881 | B1 | 2/2001 | Bolton et al. | |
| 6,237,847 | B1 | 5/2001 | Milne | 235/379 |
| 6,329,813 | B1 | 12/2001 | Andermo | 324/207.17 |
| 6,378,770 | B1 | 4/2002 | Clark et al. | |
| 2001/0011659 | A1 | 8/2001 | Izawa et al. | |
| 2002/0119346 | A1 | 8/2002 | Naoe et al. | |
| 2003/0089769 | A1 | 5/2003 | Jantsch | |
| 2004/0096665 | A1 | 5/2004 | Hoehne et al. | |
| 2004/0099725 | A1 | 5/2004 | Jantsch | |
| 2004/0123930 | A1 | 7/2004 | Nakamura | |
| 2004/0188928 | A1 | 9/2004 | Tanabe | |
| 2005/0098622 | A1 | 5/2005 | Jantsch | |

FOREIGN PATENT DOCUMENTS

| | | | |
|---|---|---|---|
| EP | 0 064 523 | | 11/1982 |
| EP | 0 064 523 | | 11/1983 |
| EP | 0 170 341 | | 2/1986 |
| EP | 0 280 147 | | 8/1988 |
| EP | 0 280 147 | A2 | 8/1988 |
| EP | 0 344 938 | | 12/1989 |
| EP | 0 356 150 | A | 2/1990 |
| EP | 0 569 606 | A1 | 11/1993 |
| EP | 0 690 288 | | 1/1996 |
| EP | 0 881 605 | A | 12/1998 |
| EP | 0 897 165 | A | 2/1999 |
| EP | 1 008 965 | A1 | 6/2000 |
| GB | 1 344 986 | | 1/1974 |
| GB | 1 497 181 | | 1/1978 |
| GB | 2 129 126 | A | 5/1984 |
| GB | 2 218 524 | | 11/1989 |
| JP | 60052427 | A | 3/1985 |
| JP | 62256808 | A | 11/1987 |
| JP | 63-256808 | | 10/1988 |
| JP | 08239141 | A | 9/1996 |
| JP | 10319682 | | 12/1998 |
| JP | H10-320624 | | 12/1998 |
| JP | H11-7573 | | 1/1999 |
| JP | A H11-328487 | | 11/1999 |
| JP | 2003-535125 | | 9/2007 |
| SU | 196492 | | 5/1967 |
| WO | WO82/01698 | | 5/1982 |
| WO | WO 82/01698 | | 5/1982 |
| WO | WO 86/00160 | | 3/1986 |
| WO | WO99/28846 | | 6/1999 |

OTHER PUBLICATIONS

Kimura, M. et al., "A Method for Obtaining A Local Density Variation in a Sheet", *SEN-1 Gakkaishi*, vol. 41, No. 7, pp. 104-108, Jan. 1985.
Yassa, FF. et al., "A Multichannel Digital Demodulator for LVDT/RVDT Position Sensors", *IEEE Journal of Solid-State Circuits*, vol. 25, No. 2, pp. 441-450, Apr. 1990.
http://www.efunda.com/designstandards/sensors/lvdt/lvdt_theory.cfm?search_string=LVDT.
http://web.archive.org/web/20010421042181/www.sensorland.com/HowPage006.html.
Efunda., Theory of Linear Variable Differential Transformer (LVDT), http//www.efunda.com/Design Standards/sensor/lvdt_theory.cfm; pp. 1-3, printed Jan. 2002.
De La Rue.; Example-User Manual, pp. 2-5, Aug. 1991.
Hadley, L.et al., "A Microprocessor-Based Servo-Loop for Linear Position Control", *Electro, Conference Record*, pp. 1-8 May 1982.
Html "How Sensors Work-LVDT Displacement Transducer", http://www.sensorland.com/HowPage006.html; pp. 1-5, printed Jan. 2002.
Kimura, M.et al., "A Method for Obtaining A Local Density Variation in A Sheet", *SEN-1 Gakkaishi*, vol. 41, No. 7, pp. 104-108, Jan. 1985.
Kimura, M.et al., "Method for Measurement of Paper Thickness using Linear Variable Differential Transducer", *Faculty of Agriculture, University of Tokyo*, pp. 49-54, 1984.
Lucas-VARITY, "R60OD RVIT, DC-Operated Rotary Variable InductanceTransducer", www.schaevitz.com, pp. 120-121.
Lucas-VARITY, "New Schaevitz™ RVIT-Z, Low Profile Design for OEM Application", www.schaevitz.com, pp. 124-125.
National Instruments Corporation, "LVDT", http:/zone.ni.com/devzone/nidzgloss.nsf/webmain.
Shaevitz, "R-Flex™ Multipurpose Coupling", www.schaevitz.com.
Sylvan, J., "Hybrid Interface for LVDTs", *Machine Design*, pp. 129-132, Oct. 1984.
Office Action from the Russian Patent Office dated Dec. 28, 2004.
Supplementary European Search Report dated Jan. 24, 2005.
EP Search Report, Aug. 3, 2007.
European Search Report, 2 pages, May 15, 2007.
Japanese Office Action, Application No. 2003-535125, dated Jan. 16, 2008.
EP published Search Report, EP Publication No. 1 739 637, Application No. 06253128.0, dated Sep. 19, 2007.
EP Extended Search Report, EP Application No. 06253128.0, dated Aug. 17, 2007.
EP Search Report, EP Application No. 02 784 055.2, dated Feb. 16, 2006.
EP Search Report, EP Application No. 02 784 055.2, dated Sep. 21, 2005.
U.S. Appl. No. 10/269,851, filed Oct. 9, 2002, PAIR Transaction History, Allowed Claims.
U.S. Appl. No. 10/944,299, filed Sep. 20, 2004, PAIR Transaction History, Current Pending Claims.
U.S. Appl. No. 11/156,880, filed Jun. 20, 2005, PAIR Transaction History.
U.S. Appl. No. 11/215,591, filed Aug. 20, 2005, PAIR Transactions History, Current Pending Claims.

* cited by examiner

DISPENSING OF CURRENCY

BACKGROUND

This invention relates to dispensing of currency.

Currency dispensers are found, for example, in automatic teller machines (ATMs), including those for so-called off-premises use (for example, at an airport, grocery store, or other location not controlled by a financial institution).

A typical currency dispenser includes a removable money box called a cassette. A stack of currency is loaded into the cassette and then delivered to and loaded into the dispenser.

The dispenser receives signals from control circuitry in the ATM when a user asks for cash. The signals could, for example, instruct the dispenser to dispense $300 in $20 bills to the user.

The dispenser includes paper transporting mechanisms that remove the needed number of bills from the money box, one after another. Each removed bill is fed along a paper path to a position at which the bill is ejected to the outside world, where the user can reach it. The dispenser then signals the control circuitry in the ATM that the needed number of bills has been dispensed.

The sheets of currency that are stacked in the money box sometimes stick together and cannot be easily separated for dispensing. So-called double detection devices are provided in dispensers to detect when more than one paper bill has been removed from the stack. The multiple bills are then discarded into a second money cassette for later pickup, rather than being dispensed to the user.

A typical currency dispenser is constructed of metal pieces, shafts, and bearings that are assembled by a lengthy sequence of steps.

SUMMARY

In general, in one aspect, the invention features a method that includes (a) withdrawing currency from a stack of bills for dispensing to a customer, (b) prior to dispensing, detecting a thickness of the withdrawn currency by pushing a free end of an elongated finger by an amount that corresponds to the thickness of the withdrawn currency, and (c) by electromagnetic coupling, determining the amount by which the free end of the elongated finger is pushed.

Implementations of the invention may include one or more of the following features. The pushing of the free end of the elongated finger is done by passing the currency between the finger and a stationary element. The finger is biased to press the currency against the stationary element. The currency is driven across the stationary element after it has been withdrawn from the stack of bills. The currency is driven across the stationary element by passing it through a nip between two rollers, the nip being spaced above the stationary element. The pushing of the free end causes rotation of the finger about an axis. The amount by which the free end is pushed is measured by relative rotation of two electromagnetically coupled elements.

In general, in another aspect, the invention features an apparatus that includes (a) a passage through which currency can be driven, (b) a free end of an elongated finger configured to be moved, when the currency is driven through the passage, by a distance that corresponds to a thickness of the currency, and (c) a pair of coupled elements that are configured to be moved relative to one another by motion of the elongated finger to detect the distance that corresponds to the thickness of the currency.

Implementations of the invention may include one or more of the following features. The passage comprises a supporting surface and a space next to the supporting surface. The movable element comprises one or more fingers projecting into the passage. The fingers have free ends that project generally in the direction in which the currency is driven. The movable element is biased towards a side of the passage. The movable element is connected to the rotational element. The rotational element is spring loaded to bias the movable element. The rotational element comprises a shaft and paddles connected to the shaft. The paddles are configured to be generally parallel to the stationary element. The shaft of the rotational element is generally perpendicular to the stationary element.

In general, in another aspect, the invention features a method that includes (a) withdrawing currency from a stack of bills for dispensing to a customer, (b) prior to dispensing, detecting a thickness of the withdrawn currency by causing relative rotation between two electromagnetically-coupled elements by an amount that corresponds to the thickness of the withdrawn currency.

In general, in another aspect, the invention features a double detect mechanism for a cash dispenser that includes (a) a passage through which currency can be driven after it is withdrawn from a money box, (b) a finger that lies in the passage and is configured to be moved, when the currency is driven through the passage, through a distance that corresponds to the thickness of the currency, (c) a rotational shaft connected to be rotated when the finger is moved, the rotational shaft bearing paddles, and (d) a circuit board bearing an electromagnetic element that cooperatives with the paddles to measure the amount of rotation of the rotational shaft.

In general, in another aspect, the invention features apparatus that includes a paper path arranged between an opening in a money box through which currency can be withdrawn for dispensing to a customer at a dispensing location that is spaced apart from the opening in the money box, the paper path including rotational shafts arranged to transfer the currency, and a housing that supports the paper path and is configured to receive the money box, the housing comprising at least two parallel spaced-apart molded side walls, the paper path comprising a molded wall or walls between the two parallel molded side walls.

Implementations of the invention may include one or more of the following features. The molded side walls and the third molded wall comprise separate pieces. A molded top wall is configured to support electromechanical drive elements. A bottom wall is also molded. Plastic snap-in bearings are mounted on the parallel side walls and configured to support ends of the rotational shafts. The opening in the money box is at one end of the housing, the dispensing location is at an opposite end of the housing, and the paper path comprises a substantially linear path between the opening in the money box and the dispensing location. A double-detect mechanism is mounted on the paper path at the money box opening. The double-detect mechanism includes a rotating element that is electromagnetically coupled to a detector on a stationary element.

In general, in another aspect, the invention features (1) a currency dispenser comprising a substantially linear paper path arranged between (a) an opening in a money box through which currency can be withdrawn and (b) a dispensing location at which the currency can be dispensed to a customer, the paper path comprising rotational shafts arranged to transfer the currency, (2) a housing configured to support the paper path to receive the money box, the housing including two parallel spaced-apart molded side walls, a third molded side wall between the two parallel molded side walls, a molded top wall configured to support electromechanical drive elements, and a molded bottom wall, the five walls being separate pieces, (3) plastic snap-in bearings mounted on the parallel side walls and configured to support ends of the rotational shafts, and (4) a double-detect mechanism mounted on the paper path at the money box opening, the double-detect mechanism comprising a rotating element that is electromagnetically coupled to a detector on a stationary element.

In general, in another aspect, the invention features a method that includes (not necessarily in this order): (a) using fasteners to assemble two parallel side walls and a paper path wall between the two parallel side walls to form a housing of a currency dispenser, (b) attaching plastic bearings to the two side walls to mount currency drive shafts across the paper path wall between the two side walls, and (c) attaching a double-detect mechanism on the paper path.

Implementations of the invention may include one or more of the following features. Fasteners are used to assemble the top and bottom walls as part of the housing. The fasteners comprise metal screws. No more than three fasteners are used to assemble the mating edges of each pair of the walls.

In general, in another aspect, the invention features apparatus that includes (a) a molded linear path having a flat supporting surface for currency being driven from a money box at one end of the path to a dispensing location at the other end of the path, (b) a pattern of static electricity grounding elements arranged along the path, and (c) coupling features configured to enable mounting of the path between two side walls of a housing of a currency dispenser. The grounding elements comprise braided wire and metal lugs. The pattern of grounding elements comprises spacing the grounding elements at small enough spacing to dissipate static charge. A double-detect mechanism is mounted on the paper path. Curved surfaces at opposite ends of the flat supporting surfaces are configured to direct currency from the money box onto the linear paper path and from the linear paper path to the dispensing location.

In general, in another aspect, the invention features determining the presence or absence of a flaw in currency being dispensed to a customer, routing the currency either to a dispensing location or to a retention location depending on the detected presence or absence of the flaw, and causing the currency to be routed by default to the retention location in the absence of a determination that a flaw is not present.

Implementations of the invention may include one or more of the following features. The flaw comprises a double bill, or the bill may be too thick. The routing is done by a movable mechanical element in which a series of bills is dispensed one after another, and the default routing is applied only to the first bill in the series after which the remaining bills in the series are routed by default to the dispensing location, unless one of those remaining bills is also determined to be flawed.

Other advantages and features will become apparent from the following description and from the claims.

DESCRIPTION

Figure 1:
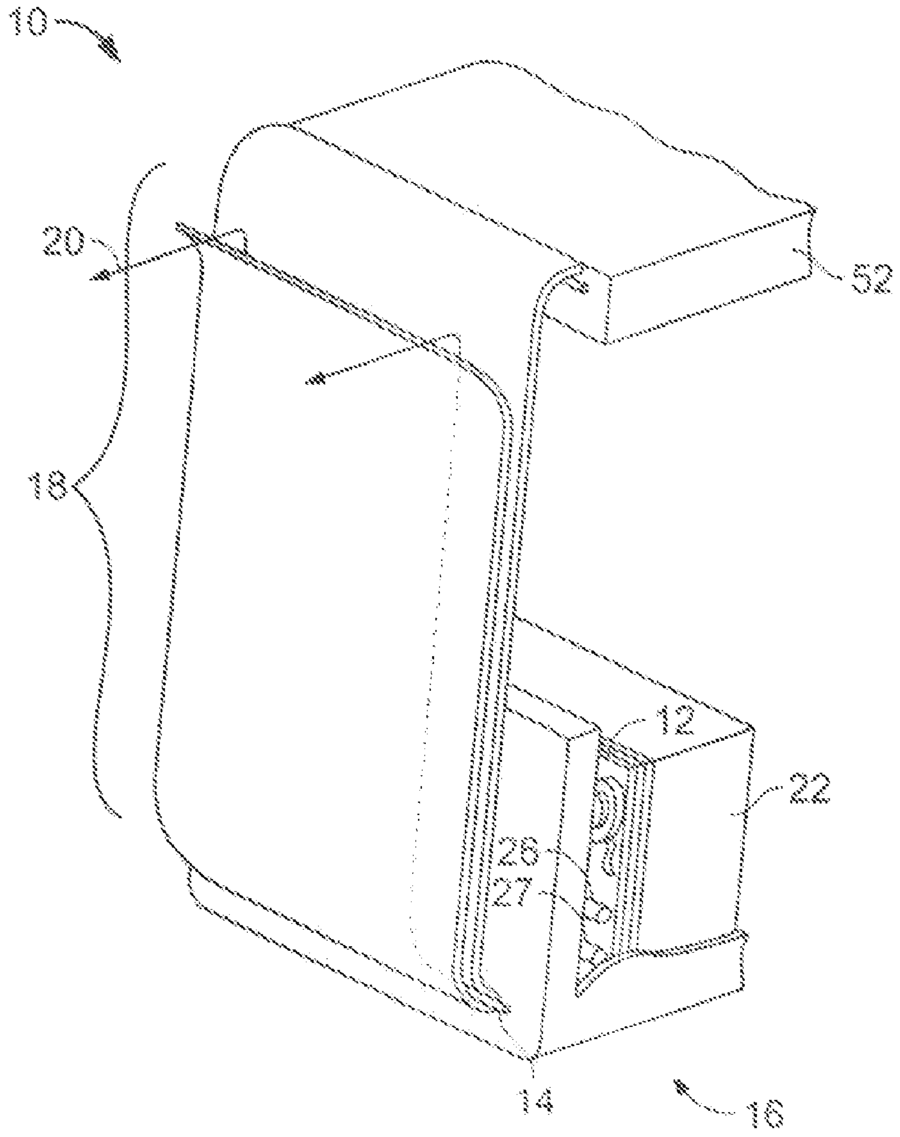
FIG. 1 is schematic perspective view of a currency path through a currency dispenser.

As shown in FIG. 1, in a currency dispenser 10, individual paper bills 12 are withdrawn one at a time from an opening 14 of a money box 16 (where a supply of bills is stored) and delivered along a linear paper path 18 to a dispensing location 20 for access by a customer.

Figure 12:
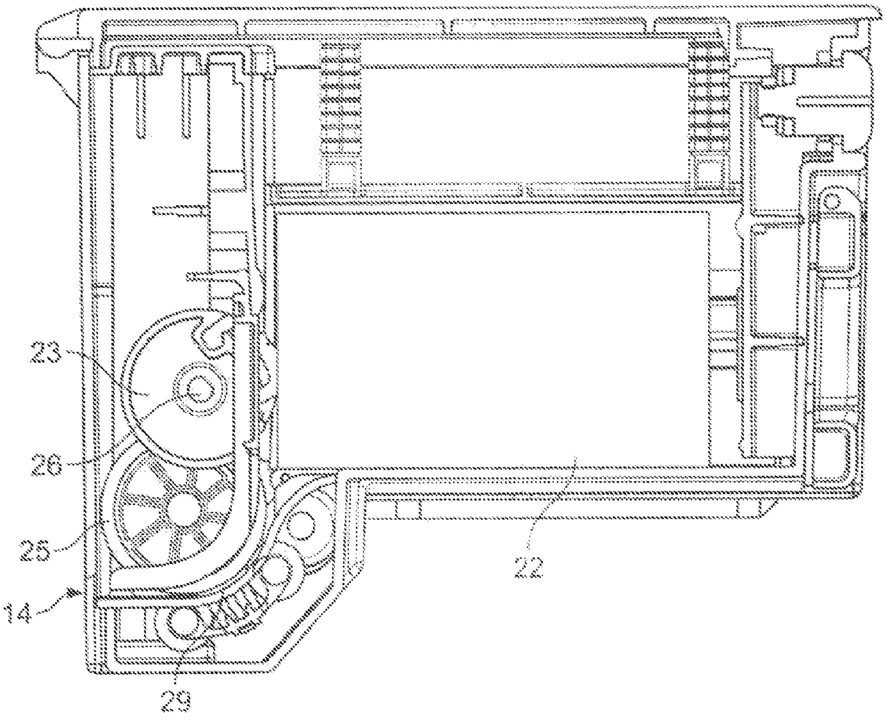
FIG. 12 is a side view of a money cassette.

As shown in FIG. 12, the bills are stored in a stack 22 inside of the money box and are peeled one at a time from the stack by the rotation of frictional rollers 23, 25 mounted on two parallel shafts 26, 27. As each bill is peeled from the stack it is driven over a curved surface 29 inside the money box so that, when it leaves the money box at opening 14, the bill is oriented perpendicularly to its orientation in the stack.

Figure 2:
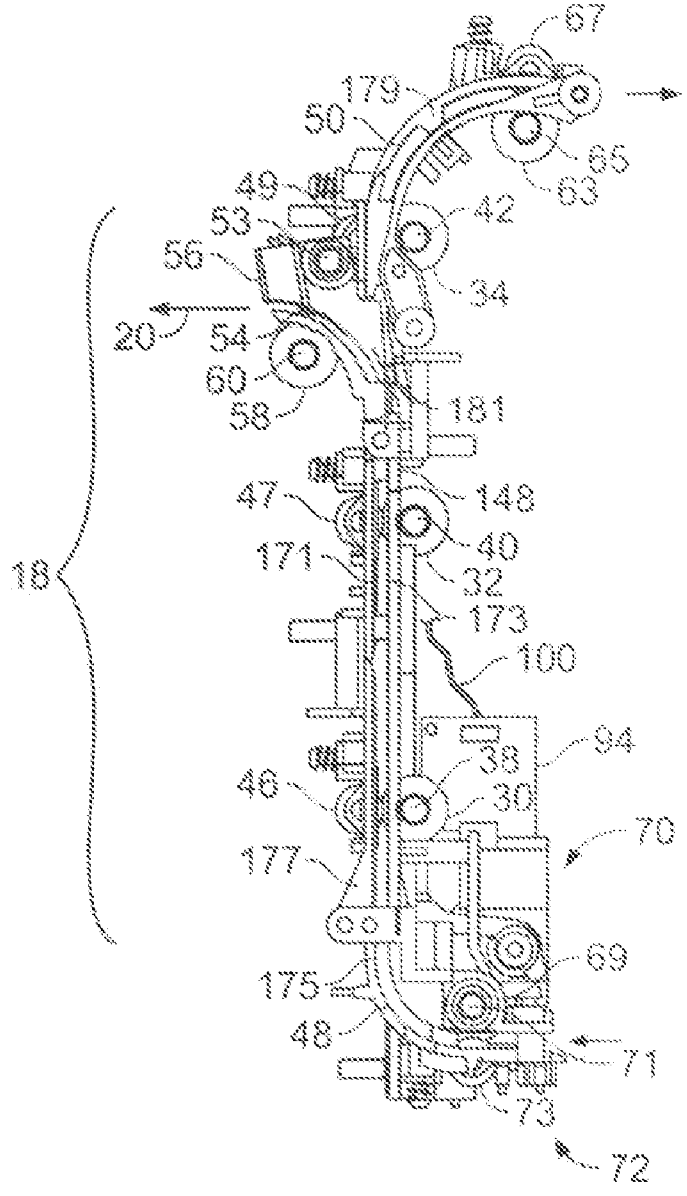
FIG. 2 is a side view of a portion of a currency dispenser that defines a paper path.
Figure 3:
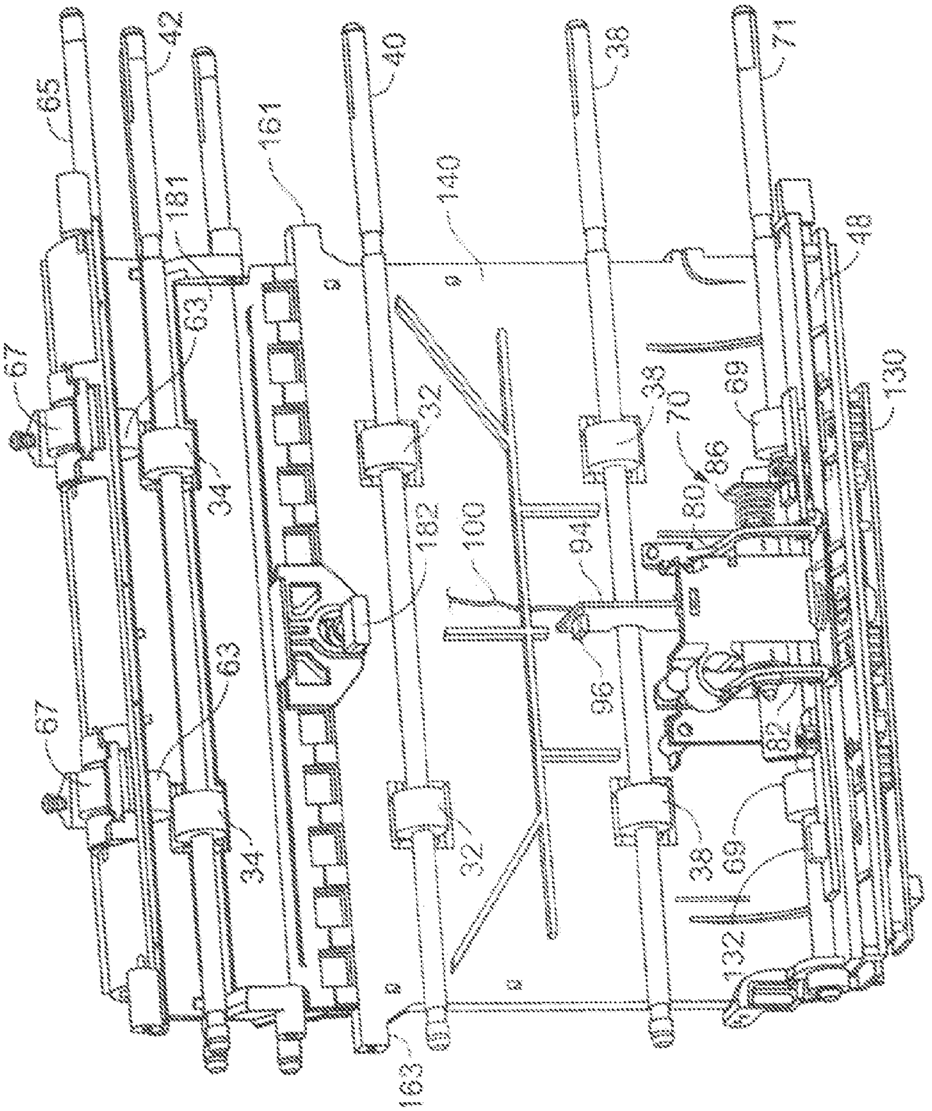
FIG. 3 is an isometric view looking at the side of the paper path mechanism that faces the inside of the dispenser.

As shown in FIGS. 2 and 3, the withdrawn bill is then driven along the paper path 18 by three pairs of frictional rollers 30, 32, 34 that are mounted on three parallel shafts 38, 40, 42 arranged along the length of the paper path. Each of the rollers cooperates with an idling nip roller 46, 47, 49 to grip the bill and drive it along the paper path.

At the lower end of the paper path a curved surface 48 diverts the bill to a direction of motion that is perpendicular to the direction in which the bill leaves the money box.

At the upper end of the paper path, the traveling bill can either be diverted by a curved surface 50 into a rejected bill collection box 52 (FIG. 1) or by a curved surface 54 (FIG. 2) to the dispensing location 20. Which way the bill travels depends on the position of a control vane 56 that can be rotated (about an axle 53) between two positions. The vane is spring-biased to a default position that rejects bills into the collection box and must be driven to the dispensing position. (The default routing is applied only to the first bill in the series after which the remaining bills in the series are routed by default to the dispensing location, unless one of those remaining bills is also determined to be flawed.)

A bill that is diverted to the dispensing location is driven out of the paper path by a fourth pair of frictional rollers 58 (mounted on a shaft 60) and nip rollers. A bill that is diverted to the collection box is driven by rollers 34 and by a fifth pair of frictional rollers 63 (mounted on a shaft 65) and nip rollers 67. A sixth pair of frictional rollers 69 (mounted a on shaft 71) and nip rollers 73 drives the bill past the curved surface 48 as it is withdrawn from the money box.

Figure 4:
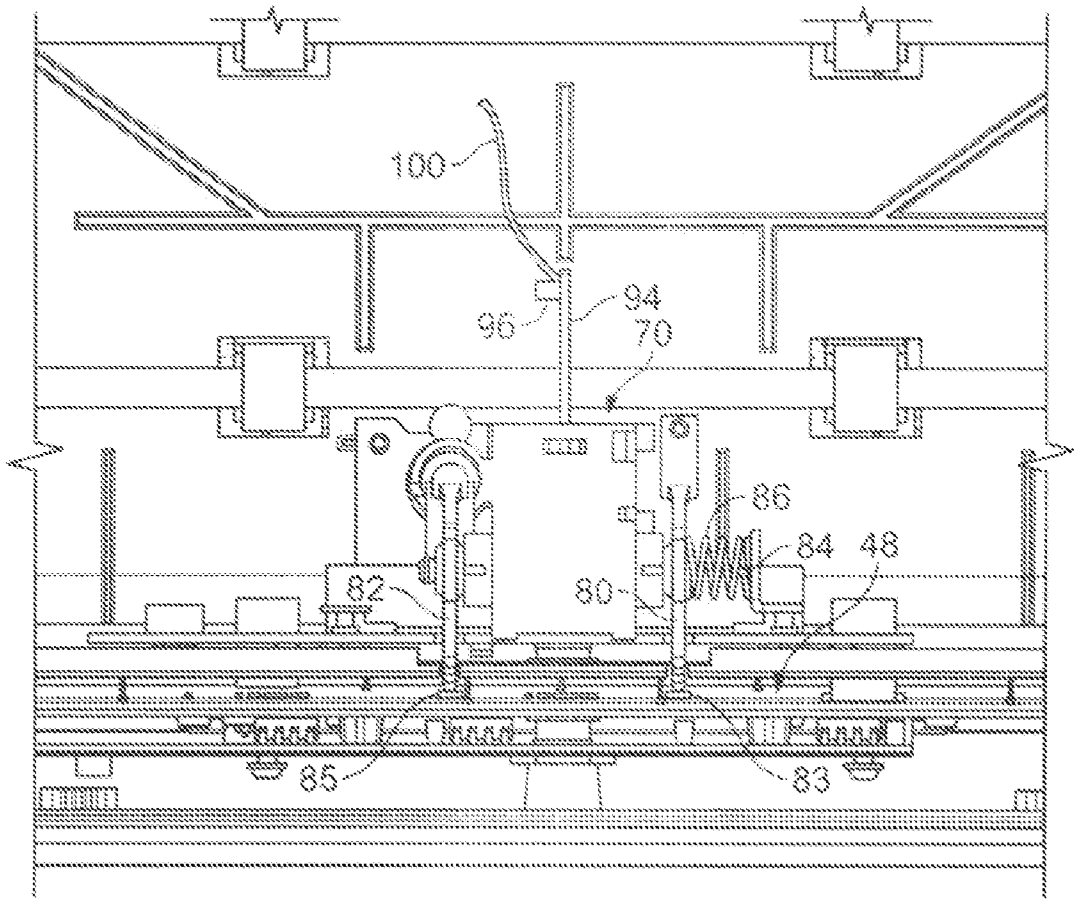
FIG. 4 is a front view of a double-detect mechanism.
Figure 13:
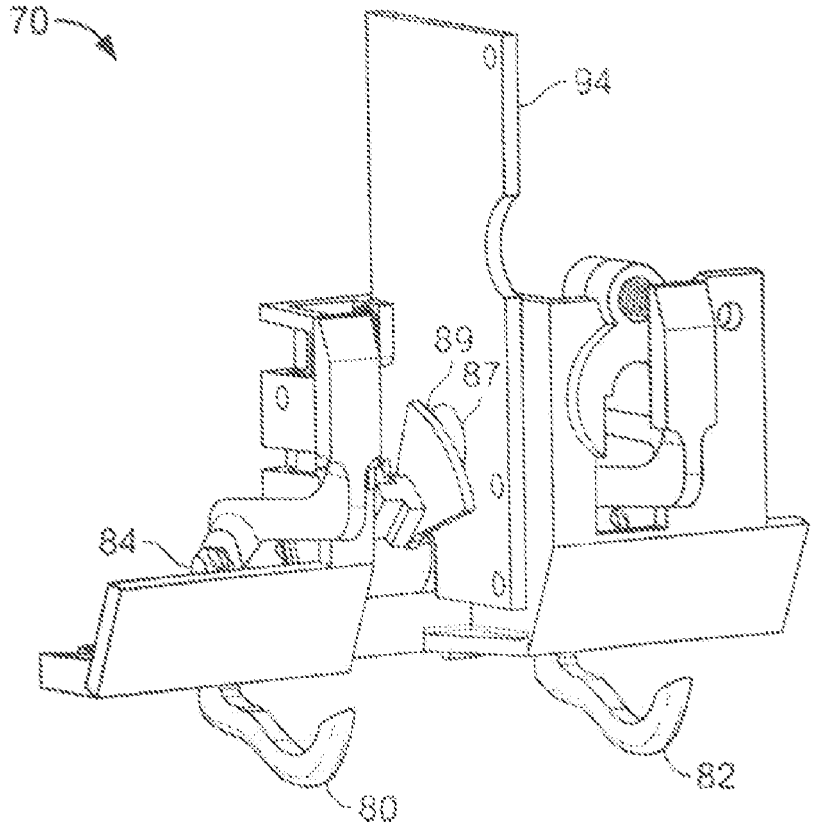
FIG. 13 is a three-dimensional view of a bill thickness detector.

As shown also in FIGS. 4 and 13, the bottom end of the paper path supports a double-detect mechanism 70 that is used to determine, for example, when more than one bill has been withdrawn from the money box at one time. If so, the dispenser leaves the vane 56 (FIG. 2) in the rejection position and the multiple bills are rejected into the collection box. Otherwise, the vane is forced to the dispensing position and the single bill is dispensed to the customer.

The double-detect mechanism determines whether more than one bill has been withdrawn from the money box by measuring the thickness of the bill and comparing it to a maximum thickness value. The thickness is measured by two fingers 80, 82 (FIG. 4) that are mounted on opposite ends of a rotating shaft 84 and are spring biased against surface ridges 83, 85 by a spring 86 on shaft 84.

As the bill is grabbed at the nip points between the fingers and the ridges (the nip points are spaced above the curved surface 48) and pulled along the surface 48, the bill forces the fingers upward by a distance equal to the thickness of the bill. As the fingers are pushed upward, they cause a corresponding rotation of the shaft 84. The rotation causes a pair of metal paddles 89 (FIG. 13; only one paddle is shown, the other being the same shape as, parallel to, and mounted in the same orientation on the other side of board 94, as paddle 89). The paddles are mounted perpendicularly on the shaft to rotate with respect to stationary metal elements 87 (only one shown) that are formed on the surfaces of a circuit board 94 (FIG. 4), which is fixed in an orientation perpendicular to the shaft. The stationary elements on the board form primary and secondary inductance coils, and the paddles provide a field path linking the coils. The metal paddles are electromagnetically coupled to the stationary elements so that the amount of rotation of the shaft 84 can be precisely detected by circuitry 96 mounted on the circuit board. A circuit board of this kind, known generally as a rotary variable inductance transducer (RVIT) is available from TRW Electronics of Hampton, Va.

The circuitry includes an analog-to-digital (A/D) converter, which receives an analog voltage signal generated by the rotation of the paddles relative to the stationary elements.

The algorithm for determining the thickness proceeds as follows: Before the note is pulled from the cassette, the voltage from the RVIT is read (through the A/D converter) to establish a baseline value for the RVIT. As the note is withdrawn from the cassette, the skew and length are determined, and the note is rejected if these values are outside required limits. Skew is a deviation from a condition in which the leading and trailing edges of the note are perpendicular to the path of travel. Length is the dimension of the note measured along the axis parallel to the normal direction of travel. For the typical note this is the shorter of the two dimensions.

As the note is withdrawn, software samples the A/D thickness readings and looks for a significant change from the baseline value. A significant change indicates that the leading edge of the note is under the fingers. Then, the software begins to sample the thickness at regular intervals (approximately every 2 milliseconds). The readings are sorted into even and odd samples (e.g., the first and third readings are even, and the second and fourth readings are odd). The even samples are added together as they are received. The same is true for the odd samples. The software watches for the thickness values to return to the approximate level of the established baseline, indicating that the trailing edge of the note has been detected. Then the even and odd sampling ceases.

The note thickness algorithm is loosely based on 'Simpson's Rule' for approximating the area enclosed by an irregular shape. Briefly (with some simplification), 'Simpson's Rule' breaks a shape into narrow strips. The area of the overall shape can be approximated by summing the areas of the strips. The irregular outline of the shape is approximated by fitting a parabola through the endpoints of each pair of adjacent strips.

Simpson's Rule is used to calculate the area of a cross section of the note, namely, of the rectangle presented when the note is viewed on edge along the short side. Since the typical note is not exactly flat as measured by the double detect fingers (there are always bumps, creases, debris, and other factors that affect the actual shape of the cross section), the rectangle of the cross section is always irregular in shape. The data required to utilize Simpson's Rule is a series of measurements of the note thickness at regular intervals. These measurements are taken as the note travels through the note path from the cassette toward the exit. If the note fails to meet the thickness requirements, the vane forces the note into a reject bin, and a new note is pulled from the cassette to replace the rejected note.

The software then applies Simpson's Rule using the formula:

Area=(4*Sum of odd samples)+(2*Sum of even samples)

The Area is divided by the number of samples taken to compensate for the speed of the note as it traveled past the thickness sensor and for notes of varying length. This gives a numeric value proportional to the average thickness of the note.

Figure 5:
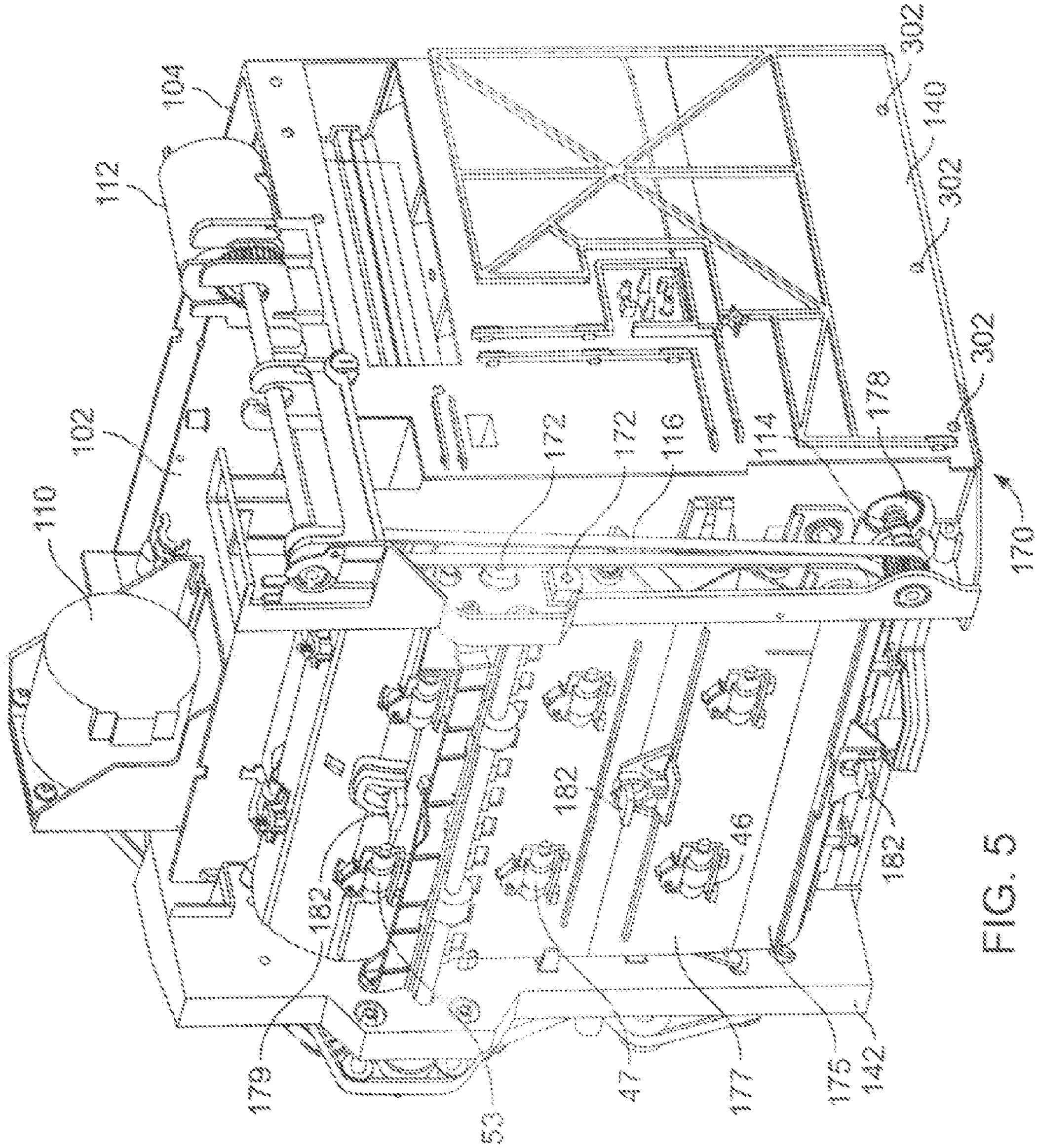
FIG. 5 is an isometric view looking toward the back and one side of the dispenser.

The output signal of the circuitry representative of the thickness is carried by a conductor 100 (FIG. 4) to dispenser control circuitry 102 mounted a top wall 104 as shown in FIG. 5. The value for the average note thickness is compared to a pre-determined range of valid readings. If the note thickness is either too high or too low, the note is rejected. If the dispenser control circuitry determines from the double-detect signal that the note thickness is within a permitted range (e.g., because only one bill has been withdrawn), it triggers a solenoid not shown to move the vane to the dispensing position.

Figure 6:
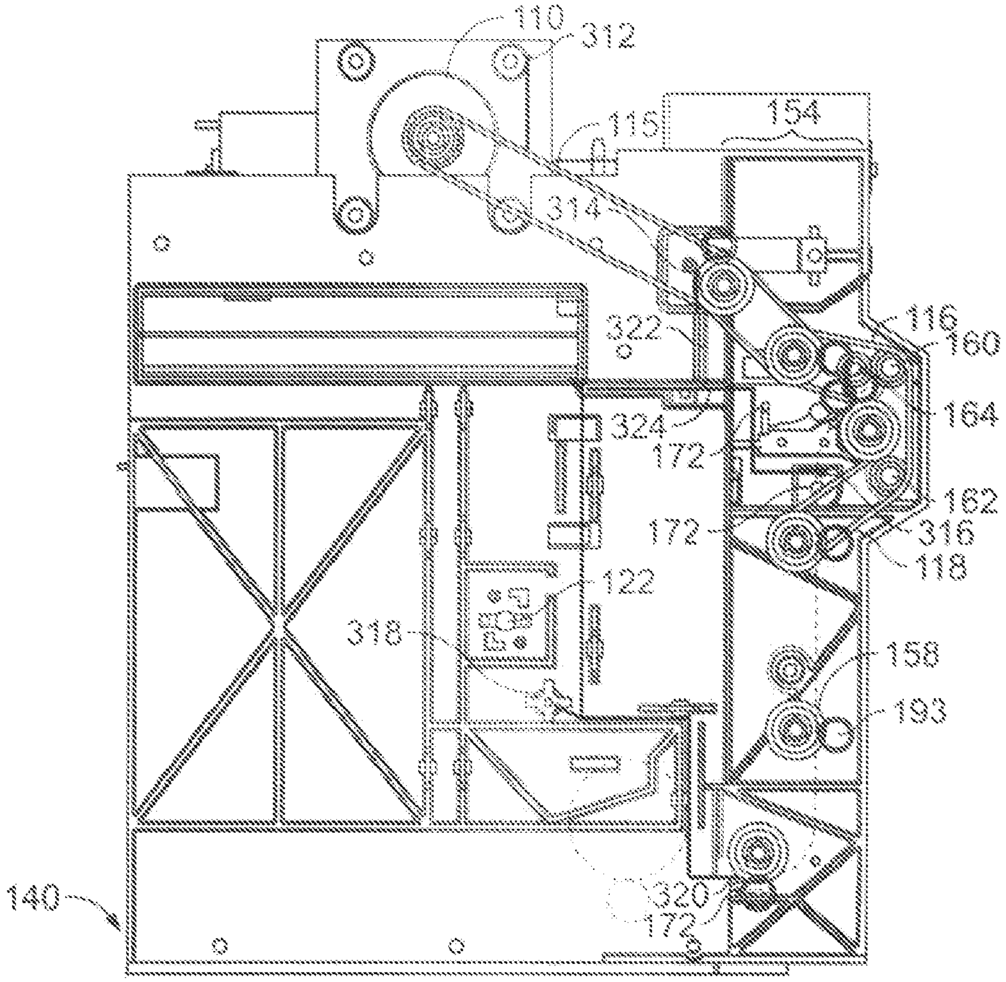
FIG. 6 is a view of one side of the dispenser.
Figure 7:
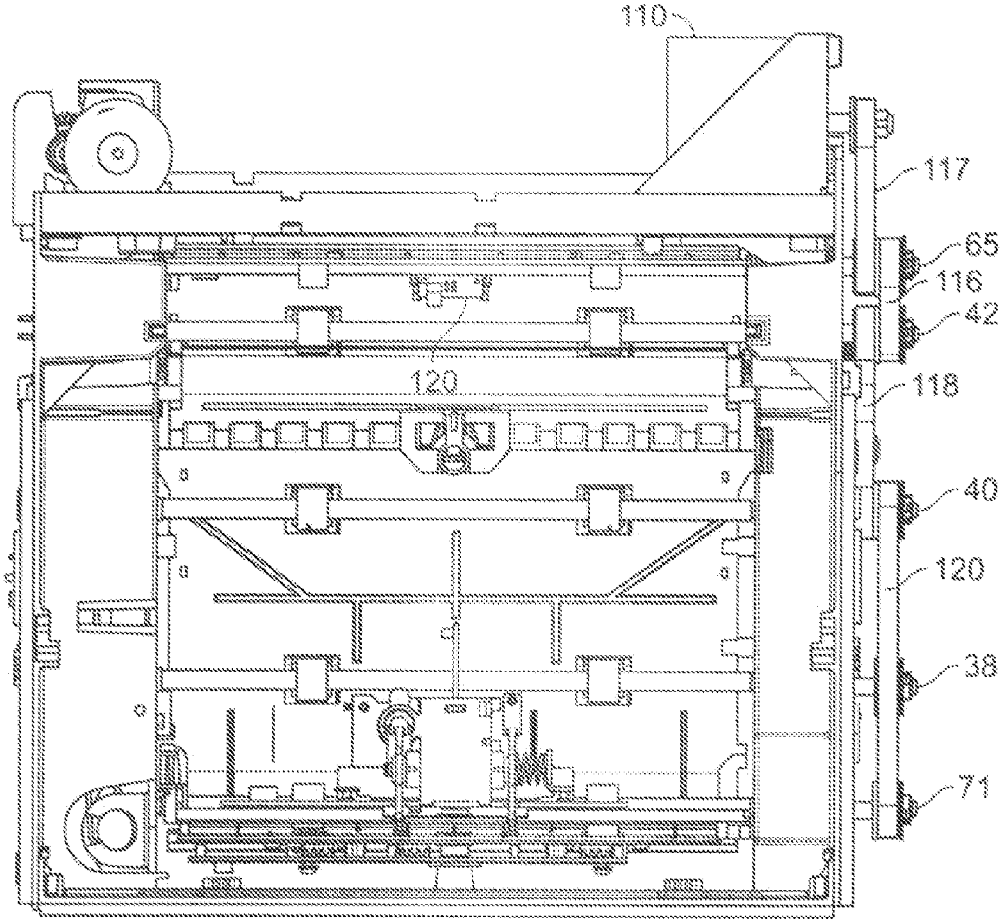
FIG. 7 is a front view of the dispenser looking toward the inside of the back wall.

Also mounted on the top wall are two motors 110, 112 (FIG. 5). As shown in FIGS. 5, 6, and 7, motor 110 drive a series of timing/drive belts 115, 116, 118, 120, which in turn drive shafts 65, 42, 40, 38, 71 through gears. Motor 112 (FIG. 5) separately drives a shaft 114 (FIG. 5) through a belt 116. Shaft 114 provides torque to drive the bill peeling mechanism inside of the money box.

Figure 8:
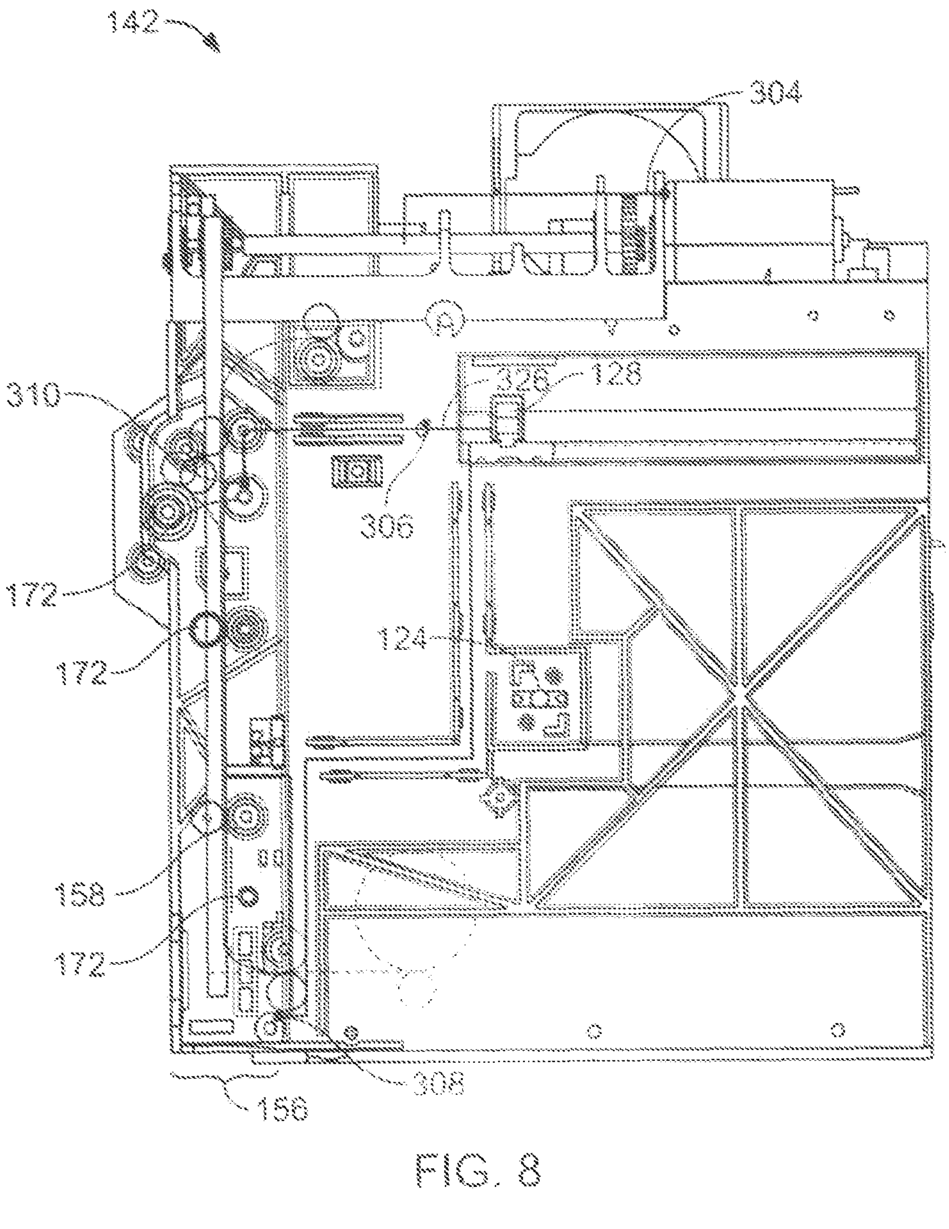
FIG. 8 is a view of the other side of the dispenser.
Figure 9:
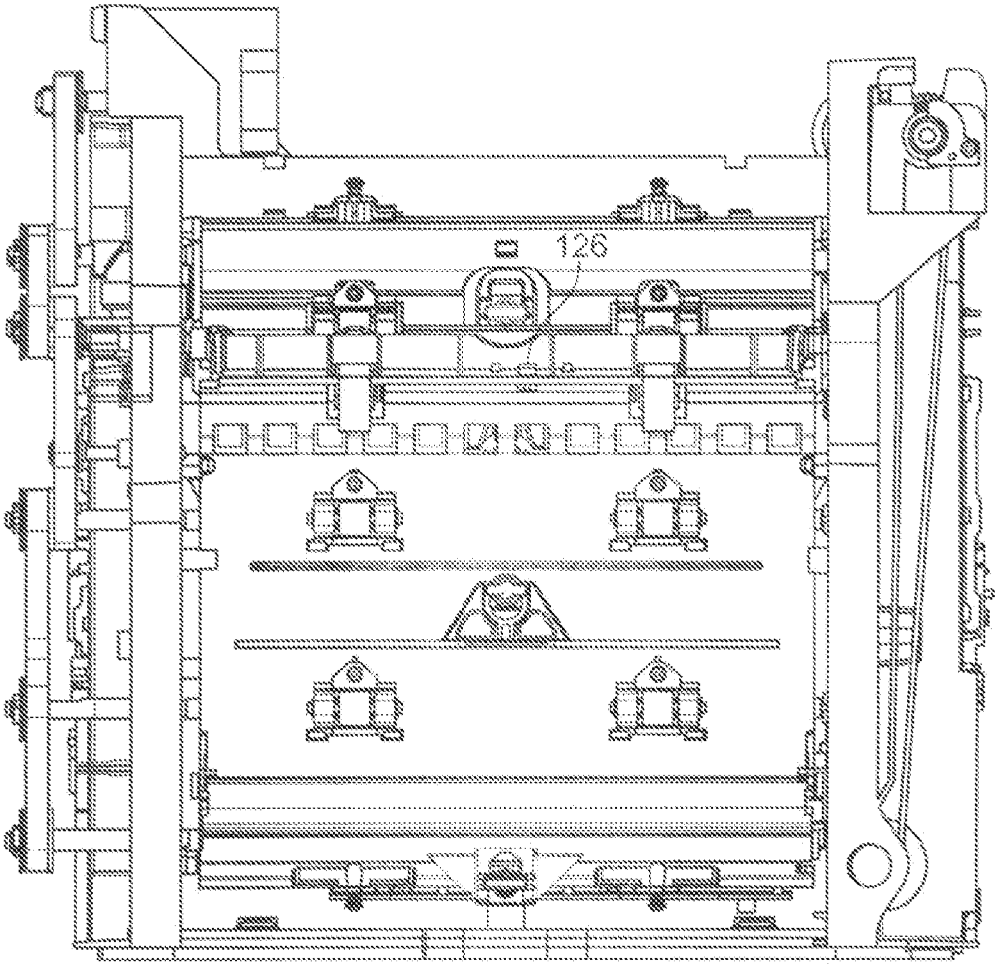
FIG. 9 is a view of the back side of the dispenser.

Photoelectronic sensors 120 (FIG. 7), 122 (FIG. 6), 124 (FIG. 8), 126 (FIG. 9), 128 (FIG. 8), 130, and 132 (FIG. 3) are mounted on the housing of the dispenser in locations that enable detection of the presence of a money box and a collection box in the housing and of the presence of a bill at points along the route traveled by the bill from the money box to the collection or the dispensing location.

The control circuitry uses information from the sensors and from external circuitry located in the ATM to control accurately the motors and the vane to dispense bills in accordance with the customer's request and to reject bills that fail the double-detect testing.

The housing of the dispenser is assembled using four walls 140, 142, 144, 146 (FIG. 10) all of which are molded of polycarbonate with 10% carbon fiber for conductivity, a lightweight yet strong plastic material.

Figure 10:
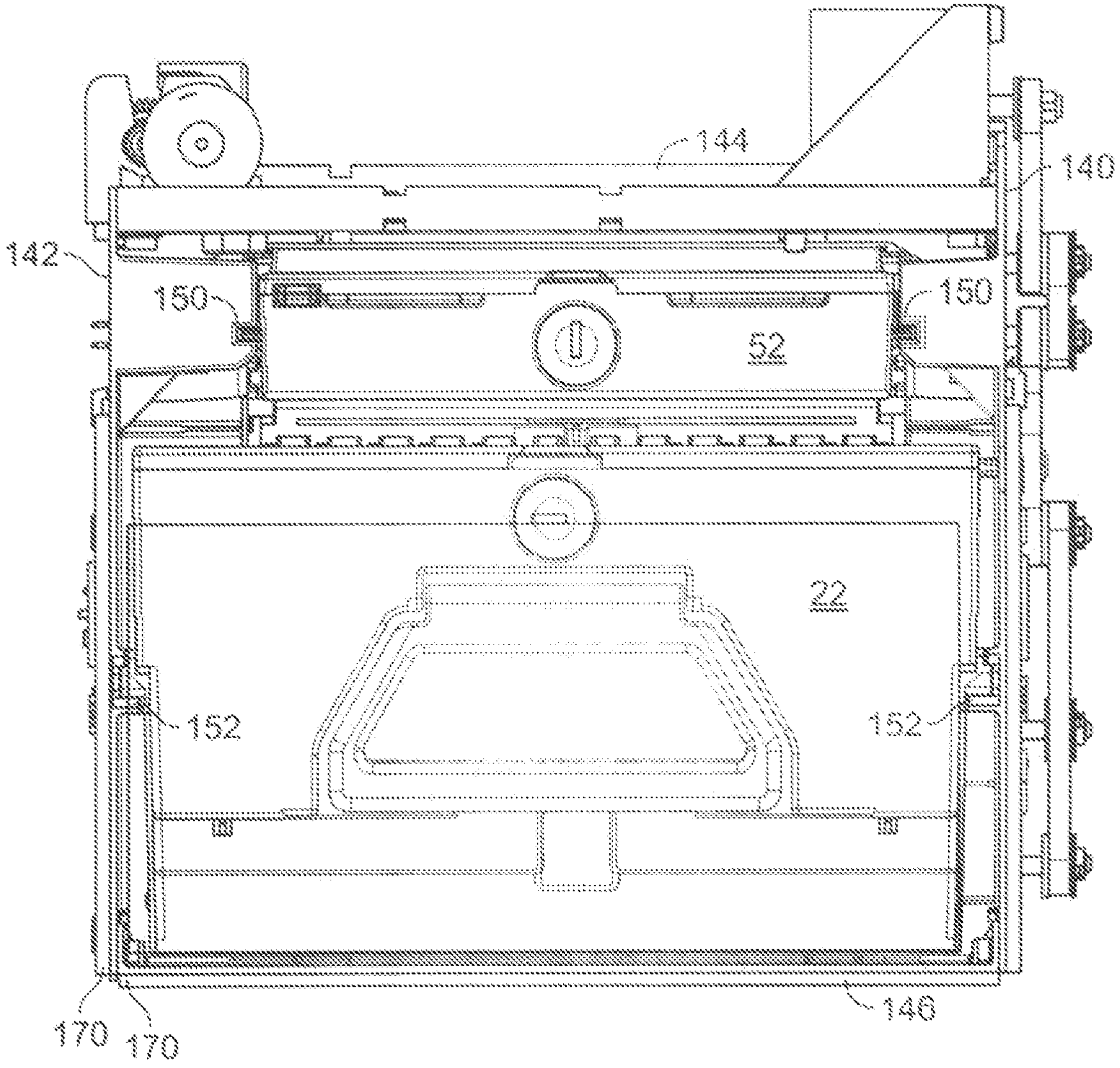
FIG. 10 is a view of the front of the dispenser.
Figure 11:
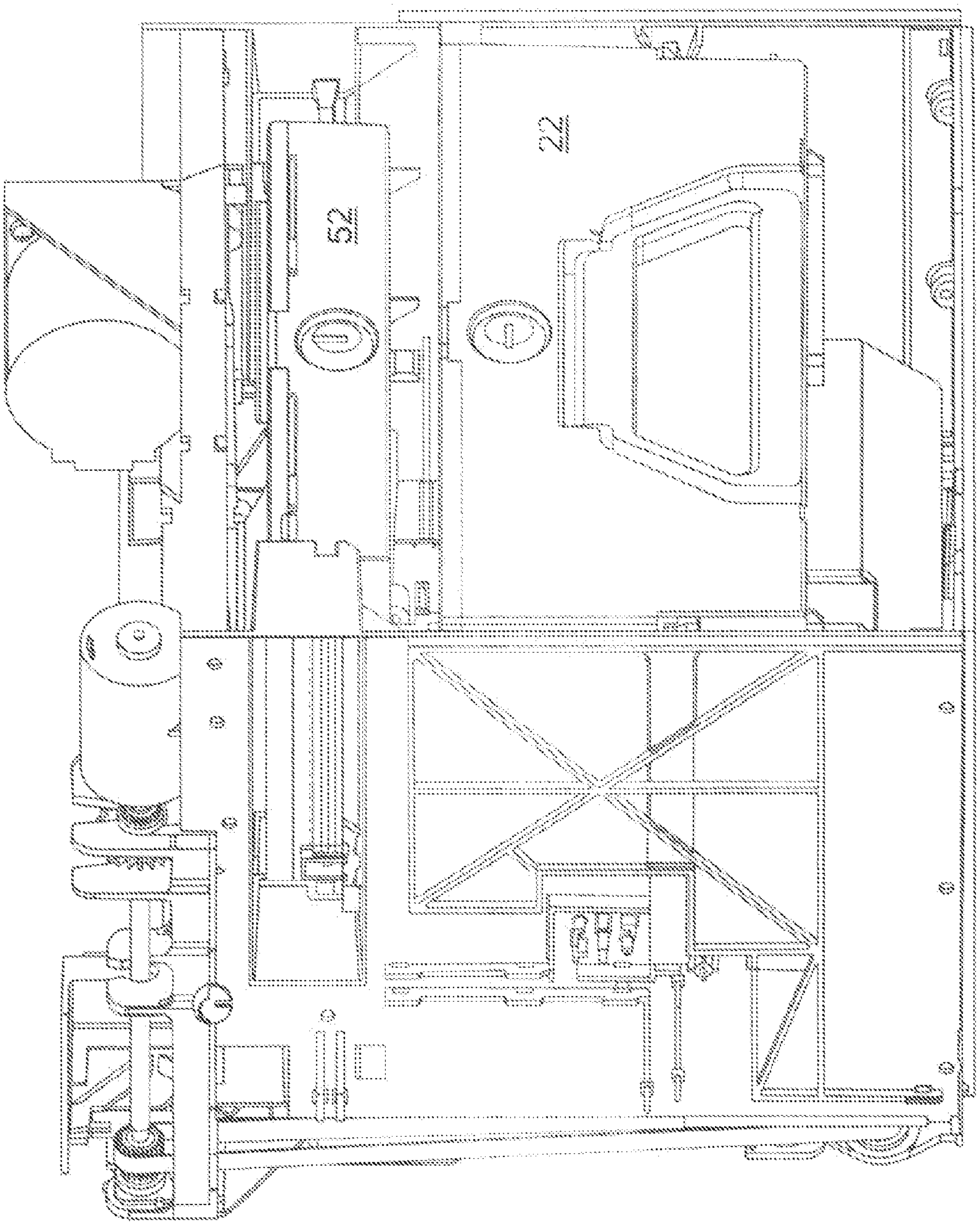
FIG. 11 is an isometric view of the front and one side of the dispenser.

As shown in FIG. 10, the two parallel sidewalls 140, 142 each bear integral slots 150, 152 to support and permit easy insertion and removal of each of the collection box and the money box.

Each of the sidewalls also includes a bearing support flange 154 (FIG. 6), 156 (FIG. 8) that includes holes in which plastic shaft bearings 158 (FIG. 8) are mounted. The shaft bearings hold and permit rotation of the corresponding shafts. The bearing support flange also supports non-rotating short shafts 160, 162, 193 (FIG. 6) that hold idler gears, and a rotating shaft 164 that supports and permits rotation of the vane.

Each of the shafts 65, 42, 58, 40, 38, 69 is held by and terminates at one end at one of the snap-in bearings. At the other end, each of the shafts projects beyond the snap-in bearing to support one of the gears.

The bearing support flange of side wall 142 also holds the shaft that is used to drive the internal mechanism of the money box.

Both side walls bear stiffening ridges and other stiffening features as shown.

The top and bottom walls 144, 146 also bear stiffening features and are connected to the side walls by metal screws 302 (FIG. 5). Only three screws are needed along the mating edges of each pair of walls, e.g., the mating edges 170.

Rear wall 148, which defines the flat linear portion of the paper path and the curved feeding surfaces at each end of the linear portion, is mounted between the two side walls using three screws 172 (FIG. 8)on each side. Fingers 161, 163 (FIG. 3) hold the paper path in a fixed position.

The paper path is defined by a channel 171 (FIG. 2) between one fixed surface 173 and facing surfaces of a series of four hinged doors 175 (FIG. 5), 177, 179, and 181 (FIG. 2). The doors and panel bear the nip rollers. The doors can be unclasped using keys 182 (FIG. 5) and opened to permit clearing of a jammed bill from the paper path.

When the money box is inserted into the housing, a key (not shown) enters a slot (not shown) in the front wall of the money box. The key triggers a mechanism (not shown) that opens a window (not shown), permitting a drive wheel 178 (FIG. 5)*to* enter the money box. The drive wheel 178 engages with and drives the bill peeling mechanism inside the money box.

A pattern of electrical discharge points 304, 306, 308, 310, 312, 314, 316, 318, 320, 322 (FIGS. 6 and 8) is arranged on the surfaces of the left and right sidewalls. The electrical discharge points are in the form of metal lugs attached to the sidewalls and are interconnected electrically by braided metal wire sections 324, 326. Connection points 308, 310, 314, 316, and 320 are attached near the ends of metal shafts to the frame panels that serve portions of the paper path as explained earlier. Connections 312 and 314 are connected to machine electrical ground. The pattern of grounding elements establishes short distances between discharge points to compensate for the internal resistance of the plastic carbon filled material that form that walls, thus effectively keeping static electricity from building up to a charge large enough to arc. The grounding elements also reduce static electricity that may cause bills to cling to the parts of the dispenser or to each other.

Because the dispenser is assembled from a small number of lightweight, easy to manipulate parts, assembly is fast and inexpensive, and the resulting dispenser is small, lightweight, and inexpensive. Maintenance can be done easily and inexpensively in case any part breaks or malfunctions.

Construction of the dispenser proceeds in the following sequence. The dispenser is designed for z-axis assembly. First, bearings and small components are installed on the left and right sidewalls. Then the bottom and top walls are installed on the left sidewall using screws. Then shafts and paper paths are installed on left sidewall. The right sidewall is then installed over all the locations established by the earlier parts. Subassemblies such as cassette motor drive, money box motor drive, paper path drive, and the control boards are then installed on the top wall, and the sensors are installed. Electrical harnesses are installed after every other part is assembled. The z-axis assembly technique allows fast and accurate placement of components.

Other implementations are within the scope of the following claims.

The invention claimed is:

1. A currency dispenser comprising a substantially linear paper path arranged between (a) an opening in a money box through which currency can be withdrawn and (b) a dispensing location at which the currency can be dispensed to a customer, the paper path comprising rotational shafts arranged to transfer the currency, a housing configured to support the paper path to receive the money box, the housing including two parallel spaced-apart molded side walls, a third molded side wall between the two parallel molded side walls, a molded top wall configured to support electromechanical drive elements, and a molded bottom wall, the five walls being separate pieces, plastic snap-in bearings mounted on the parallel side walls and configured to support ends of the rotational shafts, and a double-detect mechanism mounted on the paper path at the money box opening, the double-detect mechanism comprising a rotating element that is electromagnetically coupled to a detector on a stationary element.

2. The currency dispenser of claim 1 also including a mechanism to route the currency either to a dispensing location or to a retention location depending on the detected presence or absence of the flaw, and cause a first bill of the currency to be routed to the retention location when a flaw has been detected and to cause subsequent to be, routed to the dispensing location.

3. The currency dispenser of claim 2 in which the flaw comprises a double bill or a bill that is too thick or too thin.

4. The currency dispenser of claim 3 in which the routing is done by a movable mechanical element.

5. The currency dispenser of claim 1 in which the double-detect mechanism comprises a free end of an elongated finger configured to be moved, when the currency is driven through a passage, by a distance that corresponds to a thickness of the currency, and a pair of inductively coupled elements that are configured to be rotated relative to one another by motion of the elongated finger to detect the distance that corresponds to the thickness of the currency, the inductively coupled elements maintaining a uniform separation.

6. The currency dispenser of claim 5 also including a second finger.

7. The currency dispenser of claim 5 in which the free end projects generally in the direction in which the currency is driven.

8. The currency dispenser of claim 5 in which the finger is biased towards a side of the passage.

9. The currency dispenser of claim 5 in which the finger is connected to one of the inductively coupled elements.

10. The currency dispenser of claim 5 in which the finger is spring loaded to bias the movable element.

11. The currency dispenser of claim 5 in which one of the inductively coupled elements includes paddles connected to the elongated finger.

12. The currency dispenser of claim 11 in which the other of the inductively coupled elements is stationary and the paddles are configured to be movable and generally parallel to the stationary element.

13. The currency dispenser of claim 1 also including a pattern of static electricity grounding elements arranged along the path.

14. The currency dispenser of claim 13 in which the grounding elements comprise braided wire and metal lugs.

15. The currency dispenser of claim 13 in which the pattern of grounding elements comprises spacing the grounding elements at small enough spacing to dissipate static charge.

16. The currency dispenser of claim 13 also including curved surfaces at opposite ends of the flat supporting surfaces, the curved surfaces being configured to direct currency from the money box onto the linear paper path and from the linear paper path to the dispensing location.

* * * * *

UNITED STATES PATENT AND TRADEMARK OFFICE

CERTIFICATE OF CORRECTION

PATENT NO. : 7,387,236 B2
APPLICATION NO. : 09/973186
DATED : June 17, 2008
INVENTOR(S) : Gregory Jantsch It is certified that error appears in the above-identified patent and that said Letters Patent is hereby corrected as shown below:

Column 8, line 12, cancel the text beginning with "2. The currency dispenser" to and ending "dispensing location." in column 8, line 20, and insert the following claim:

--2. The currency dispenser of claim 1 also including a mechanism to route the currency either to a dispensing location or to a retention location depending on the detected presence or absence of the flaw, and cause a first bill of the currency to be routed to the retention location when a flaw has been detected and to cause subsequent to be routed to the dispensing location.--

Signed and Sealed this

Ninth Day of September, 2008

JON W. DUDAS
*Director of the United States Patent and Trademark Office*